Jan. 10, 1956
A. O. WHITE
2,730,387
APPARATUS FOR PREVENTING RELATIVE
MOTION BETWEEN A SHAFT AND A HUB
Filed Jan. 15, 1952
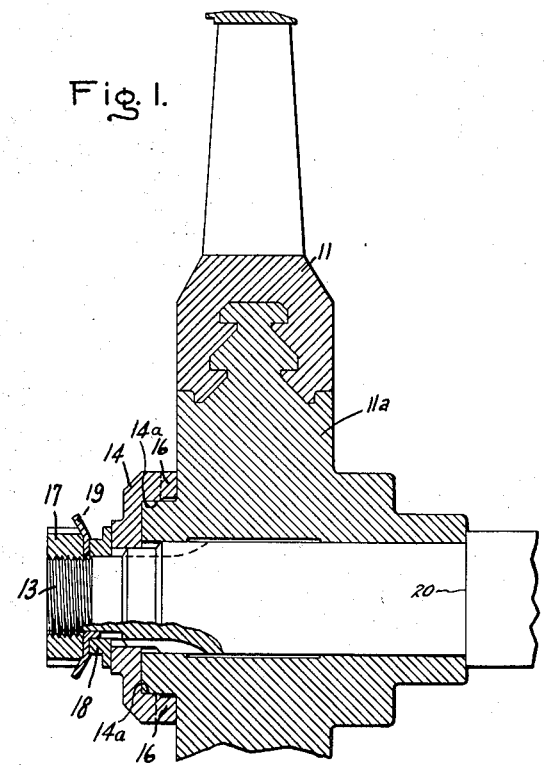
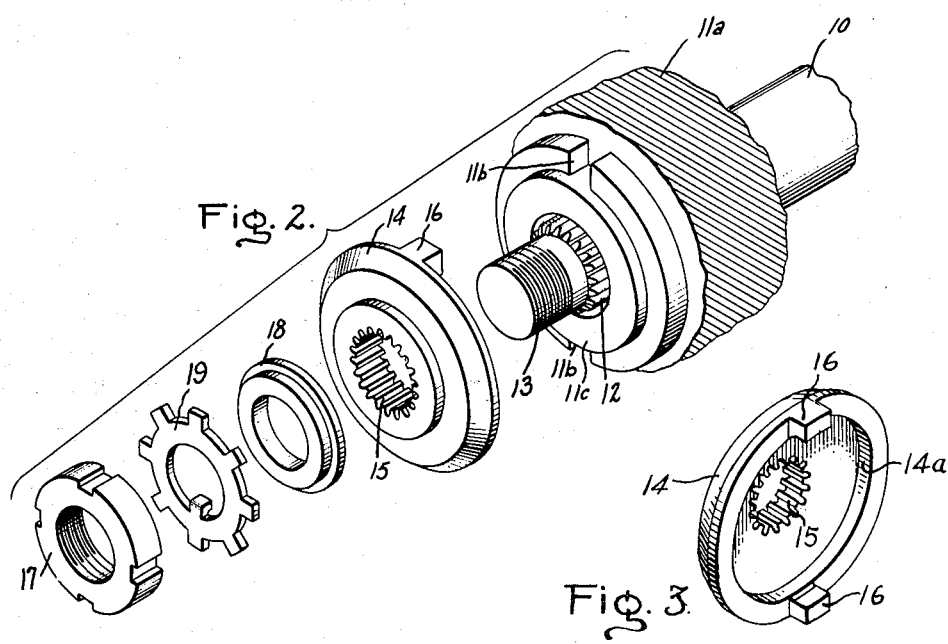
Inventor:
Albert O. White,
by Paul A. Frank
His Attorney.

United States Patent Office 2,730,387
Patented Jan. 10, 1956

2,730,387

APPARATUS FOR PREVENTING RELATIVE MOTION BETWEEN A SHAFT AND A HUB

Albert O. White, Schenectady, N. Y., assignor to General Electric Company, a corporation of New York Application January 15, 1952, Serial No. 266,492

3 Claims. (Cl. 287—53)

This invention relates to an apparatus for preventing relative motion between a hub and a shaft on which the hub is mounted. More particularly, the invention relates to an apparatus for mounting a hub on a shaft without cutting slots or splines on the inner surface of the hub or making a bore therein.

The usual way in which a hub is fixedly mounted on a shaft is to cut a groove in the shaft and in the hub and to line up these two grooves and insert in the resulting aperture a metal key having the dimensions of the aperture. The metal key offers great resistance to the shear forces acting upon it. Another method is by the use of splines integral with the shaft mating with slots or grooves cut in the hub. A less effective but frequently used method is to make a radial bore through the hub, or a portion thereof, tap the bore, and tighten a screw therein against the shaft. Both methods necessitate a cutting operation on the hub and this operation results in a certain amount of weakening of the hub. Where the hub is part of a turbine wheel of the type used in jet engines and gas turbines for airplanes, the cutting operation can be very detrimental since the hub is highly stressed, being made as light as possible in order to conserve weight.

It is, therefore, an object of this invention to provide apparatus for fixedly mounting a hub on a shaft without performing a cutting operation on the hub in a region of high stress.

It is another object of this invention to provide means for driving a turbine wheel which does not involve performing a cutting operation on the wheel in a region of high stress.

Briefly stated, in accordance with one aspect of my invention, a shaft on which a hub is mounted has a splined and threaded end extending through the hub. A splined driving dog is mounted on the splined portion of the shaft. A pair of lugs bring the driving dog and hub into engagement under the urging of a locking retainer nut screwed on to the threaded end of the shaft.

In the drawing, Fig. 1 is a partial sectional view of a shaft with a turbine wheel mounted thereon in accordance with the invention.

Fig. 2 is an exploded perspective of the device illustrated in Fig. 1.

Fig. 3 is a perspective view of a portion of my device.

Referring to Figs. 1, 2 and 3, a rotatable shaft 10 is proportioned to have mounted thereon the hub 11a of a turbine wheel 11. A portion of the shaft 10 extends through the hub of the turbine wheel 11 and this extending portion has formed thereon splines 12 and a threaded end portion 13.

A driving dog 14 is equipped with splines 15 which mate with the splines 12 and enable the driving dog 14 to be mounted on the shaft 10 in a manner such that it may not be rotated relative to the shaft 10 but has movement along the longitudinal axis of the shaft. A pair of oppositely spaced lugs 16 extend from the driving dog 14 toward the turbine wheel 11. The turbine wheel 11 has a hub 11a which is equipped with surfaces 11b adapted to engage the lugs 16. These surfaces 11b may take the form either of lugs extending toward the driving dog lugs 16 or they may be recesses which provide walls adapted to engage the lateral surfaces of the lugs 16. Driving dog 14 also has a circular recess 14a into which circular land 11c of turbine wheel hub 11a closely fits.

A locking nut 17, which may be spaced from the driving dog 14 by a washer 18, is screwed on the threaded end portion 13 of the shaft 10 and in conjunction with a locking washer 19 serves as a means for tightening the driving dog 14 against the turbine wheel 11, which is restrained from moving axially by a shoulder 20 on the shaft 10.

In order to position the turbine wheel 11 upon the shaft 10, it is merely necessary to position these parts with the shaft extending through the hub of the turbine wheel. The driving dog 14 is then positioned on the shaft 10 and the washer 18 likewise positioned on the shaft with locking washer 19 and the locking nut 17 tightened until the driving dog 14 is firmly positioned against or closely mated with the turbine wheel hub 11a, and hence turbine wheel 11, clamping it endwise between said washers and driving dog and the shoulder 20.

The invention has been described with reference to a turbine wheel because it solves a problem frequently met in turbine wheel operation. The bore of a turbine wheel is highly stressed on account of the light construction and the high speed at which it rotates. Slots or set screw holes in the hubs of turbine wheels create stress concentrations where fractures are likely to occur under the rigorous operating conditions to which a turbine wheel is subjected. My invention not only avoids the weakening of a turbine wheel caused by cutting keyways, splines, or set screw apertures but actually provides a means of strengthening the wheel since a close fit may be provided between a circular recess 14a in the driving dog 14 and a cylindrical land 11c on the face of the turbine wheel hub 11a, thereby enabling the dog 14 to aid the turbine wheel 11 in resisting deformation due to centrifugal forces during high speed rotation of the wheel. While the invention is described with reference to a turbine wheel, it is obvious that it may be applied to any shaft-hub construction where it is desired to fixedly mount a hub on a shaft without providing keyways or set screw apertures.

While my invention has been described with reference to particular embodiments thereof, it will be understood that numerous modifications may be made by those skilled in the art without actually departing from the spirit of the invention. Therefore, I aim in the appended claims to cover all such equivalent variations as come within the true spirit and scope of the foregoing disclosure.

What I claim as new and desire to secure by Letters Patent in the United States is:

1. A turbine wheel assembly comprising a turbine wheel, a shaft on which said wheel is mounted, said shaft having a splined portion extending beyond the hub of said turbine wheel, a splined driving dog mounted on the splined portion of said shaft, said dog having a circular recess which closely mates with a corresponding cylindrical land on the hub of said turbine wheel said dog and said turbine wheel being in snug engagement one with the other whereby relative rotation of said elements is prevented and said dog aids the wheel in opposing centrifugal deformation stresses applied thereto during operation.

2. A turbine wheel assembly comprising a turbine wheel, a shaft on which said wheel is mounted, said shaft having a splined portion extending beyond the hub of said turbine wheel, a splined driving dog mounted on the splined portion of said shaft, said dog having a circular recess which closely mates with a corresponding cylindrical land on the hub of said turbine wheel a lug extending from said driving dog to said turbine wheel, said lug being in snug engagement with a recess in said turbine wheel whereby relative rotation of said elements is prevented and said dog aids the wheel in opposing centrifugal deformation stresses applied thereto during operation.

3. A turbine wheel assembly comprising a turbine wheel having a pair of oppositely disposed recesses positioned on the hub thereof, a shaft on which said wheel is mounted, said shaft having a threaded end and a splined portion extending through the hub of said wheel, a splined driving dog mounted on the splined portion of said shaft, said dog having a circular recess which closely mates with a corresponding cylindrical land on the hub of said turbine wheel, a pair of oppositely disposed lugs mounted on said dog, each lug being positioned in the corresponding recess in the hub of said wheel in snug fitting relationship whereby said dog aids the wheel in opposing centrifugal deformation stresses applied thereto during operation, and a retainer screwed on the threaded portion of said shaft for tightening said lugs against said wheel.

References Cited in the file of this patent

UNITED STATES PATENTS

| | | |
|---|---|---|
| 775,764 | Pugh | Nov. 22, 1904 |
| 776,935 | Pugh | Dec. 6, 1904 |
| 1,511,910 | Royce | Oct. 14, 1924 |